US008660603B2

(12) United States Patent
Block et al.

(10) Patent No.: US 8,660,603 B2
(45) Date of Patent: Feb. 25, 2014

(54) MOBILE RADIO MODULE FOR MULTIBAND-MULTIMODE OPERATION

(75) Inventors: Christian Block, Stainz (AT); Christian Korden, Munich (DE); Edgar Schmidhammer, Stein (DE)

(73) Assignee: EPCOS AG, Munich (DE)

( * ) Notice: Subject to any disclaimer, the term of this patent is extended or adjusted under 35 U.S.C. 154(b) by 632 days.

(21) Appl. No.: 12/241,956

(22) Filed: Sep. 30, 2008

(65) Prior Publication Data
US 2009/0093270 A1 Apr. 9, 2009

Related U.S. Application Data

(63) Continuation of application No. PCT/DE2007/000561, filed on Mar. 28, 2007.

(30) Foreign Application Priority Data

Mar. 31, 2006 (DE) .......................... 10 2006 015 072

(51) Int. Cl.
*H04M 1/00* (2006.01)
(52) U.S. Cl.
USPC .............. 455/552.1; 455/78; 455/83; 455/88; 455/553.1; 370/276
(58) Field of Classification Search
USPC ............. 333/101; 455/101, 78, 83, 88, 552.1, 455/553.1; 370/276
See application file for complete search history.

(56) References Cited

U.S. PATENT DOCUMENTS

| 7,142,884 B2 | 11/2006 | Hagn |
| 7,596,357 B2 * | 9/2009 | Nakamata et al. ............... 455/78 |
| 2002/0032038 A1 | 3/2002 | Furutani et al. |
| 2002/0090974 A1 | 7/2002 | Hagn |
| 2004/0047306 A1 | 3/2004 | Katagishi et al. |
| 2004/0201423 A1 | 10/2004 | Weigand et al. |
| 2004/0242182 A1 | 12/2004 | Hidaka et al. |
| 2005/0118977 A1 * | 6/2005 | Drogi et al. ..................... 455/323 |
| 2005/0253664 A1 * | 11/2005 | Hyvonen ....................... 333/101 |
| 2006/0128393 A1 * | 6/2006 | Rooyen ....................... 455/452.2 |
| 2007/0042802 A1 * | 2/2007 | Park et al. ................... 455/552.1 |
| 2007/0085754 A1 * | 4/2007 | Ella et al. ....................... 343/862 |
| 2007/0213015 A1 * | 9/2007 | Nagano et al. .................. 455/83 |
| 2007/0264935 A1 * | 11/2007 | Mohebbi ....................... 455/41.2 |

FOREIGN PATENT DOCUMENTS

| DE | 10054968 A1 * | 5/2002 |
| EP | 1 418 680 A1 | 5/2004 |
| EP | 1 499 028 A1 | 1/2005 |
| EP | 1 503 521 A1 | 2/2005 |
| JP | 2002-064400 A | 2/2002 |

(Continued)

*Primary Examiner* — Yuwen Pan
*Assistant Examiner* — Fatuma Sherif
(74) *Attorney, Agent, or Firm* — Slater & Matsil, L.L.P.

(57) ABSTRACT

A module for a mobile radio device is proposed, whose central element is a multiswitch MS, which, as desired, can connect outputs for transmission and/or reception branches SZ, EZ of different mobile radio systems to an antenna ANT. The module is suitable for a multiband operation and, optionally, additional multimode operations and includes at least one pair of outputs for transmission and reception branches of a frequency duplexed mobile radio system. Between each output of the multiswitch and the antenna, a matching element is provided, which allows an electrical matching of the branches to be connected to it. The duplex operation is carried out via separate transmission and reception filters, or on the switch via separate outputs for transmission and reception branches.

20 Claims, 10 Drawing Sheets

(56) References Cited

FOREIGN PATENT DOCUMENTS

| | | |
|---|---|---|
| JP | 2002-185356 A | 6/2002 |
| JP | 2002-325049 A | 11/2002 |
| JP | 2002-335104 A | 11/2002 |
| JP | 2003-037520 | 7/2003 |
| JP | 2004032390 A * | 1/2004 ............ H04B 1/50 |
| JP | 2004-297456 A | 10/2004 |
| JP | 2005-295350 A | 10/2005 |
| JP | 2006-014102 A | 1/2006 |
| WO | WO 03/107551 A1 | 12/2003 |
| WO | WO 2005/088847 A1 | 9/2005 |
| WO | WO 2005/125031 A1 | 12/2005 |

* cited by examiner

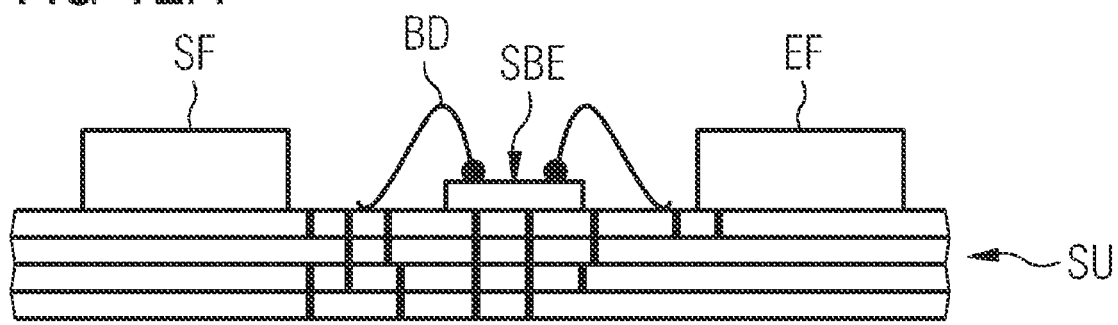
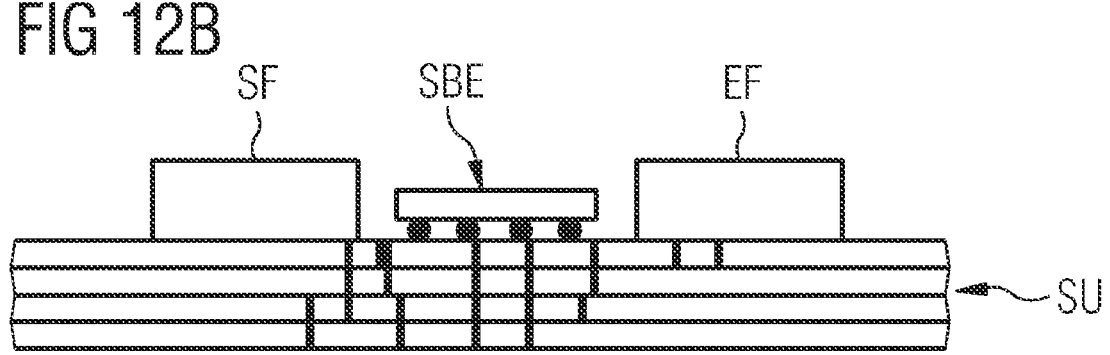
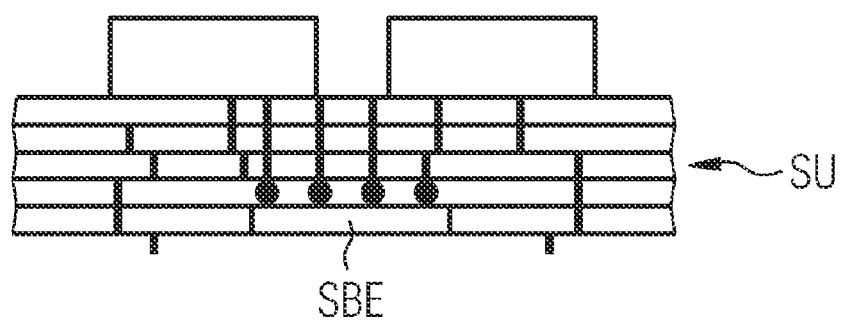

MOBILE RADIO MODULE FOR MULTIBAND-MULTIMODE OPERATION

This application is a continuation of co-pending International Application No. PCT/DE2007/000561, filed Mar. 28, 2007, which designated the United States and was not published in English, and which claims priority to German Application No. 10 2006 015 072.4 filed Mar. 31, 2006, both of which applications are incorporated herein by reference.

BACKGROUND

In the field of mobile communication, miniaturization continues with increasingly higher integration. For example, in future telephones, in addition to 4 Global System for Mobile Communications (GSM) bands, there will be an additional 3 bands for Wideband Code Division Multiple Access (WCDMA), for which mobile telephones have to be designed. In addition, different transmission standards, such as, WCDMA and GSM, require different architectures both with regard to the front end and with regard to the corresponding RF integrated circuit (IC).

WCDMA uses frequency duplex methods (FDD), and it requires a duplexer at the antenna to be able to transmit and receive simultaneously. In the case of GSM, one transmission-receiver toggle switch is sufficient, which can also be used as a band toggle switch.

FIG. 1 shows the classic architecture of a known multimode-multiband front end for QB (quadband) GSM/EDGE and 3-band WCDMA. All components are placed as discrete elements on the circuit board of the mobile telephone and are connected to an antenna via a coupling element M. This coupling element in the simplest case is a 1-on-N switch. As is already apparent from FIG. 1, in this type of architecture, only receive (RX) and transmit (TX) paths for GSM can be reasonably arranged, and connected by the shortest path. However, as soon as paths for WCDMA are added, a decision must be made regarding the side on which the duplexer component should be arranged.

In FIG. 1, the duplexer is arranged, for example, on the TX side, which has the consequence that feed lines from the RX gate of the duplexer into the WCDMA receiver (RF IC) cross other signal paths and/or become too long, which results either in undesired signal coupling or increased insertion loss.

The problem of the invention is to provide a module that can be used in a multiband-multimode front end, and that allows a more elegant, more cost advantageous and/or more compact connection in the front end.

SUMMARY

Embodiments of the invention provide a module intended for the multiband, multimode or multiband-multimode operation of a mobile radio device, which can be used in the front end, i.e., on the antenna side. A central element of the module consists of a multiswitch, which, as desired, can connect one or more outputs for transmission and/or reception branches of different mobile radio systems to an antenna. An output thus denotes an (external) connection of the multiswitch, regardless of whether it carries a (Tx) signal to the antenna or an (Rx) signal away from the antenna. At least one of the mobile radio systems here uses the frequency duplex method, where the transmission branch and reception branch must be connected simultaneously to the antenna, to allow simultaneous transmission and reception.

In the indicated module, an architecture is provided that spatially separates the transmission and reception branches from each other and associates them separately with different switch outputs. For the operation in a mobile radio system with the frequency duplex method, at least one switch position is provided for the multiswitch, which position connects the transmission branch and the reception branch of the first (frequency duplexed) mobile radio system simultaneously to the antenna. To allow the FDD duplexer function, matching elements are integrated in the module for several, preferably all, connectable branches, where the elements, in a corresponding switch position, are assigned or connected to the branch at the output of the switch, and therefore also connected to the antenna in this switch position.

Embodiments of the invention are based on the idea of arranging reception filters (RX filters) and transmission filters (TX filters) of the duplexer in mutually separated branches, and to combine all the circuits of at least two different mobile radio systems at the central switch. Additional branches can also comprise unduplexed and, therefore individually connectable, transmission and reception branches of a mobile radio system, which uses a TDD duplex method (Time Division Duplexing). The central multiswitch allows the arrangement of all the transmission branches with the TX filters arranged on one side of the switch, and all the reception branches with the RX filters arranged on the other side of the switch, and thus to separate them spatially according to function. As a result, it is possible to completely prevent conductor crossings and to lead all the branches "in parallel," but separated into RX and TX branches, on the module or on a printed circuit board that comprises the module. In this way, the connections between the switch outputs and the corresponding inputs of the signal processing ICs (RF-IC) can be minimized with regard to length. In the proposed module, it is also possible to arrange all the branches and their components on a surface of the module or on the printed circuit board comprising the module, without any interfering coupling occurring between the RX and TX branches.

The mutually independent connection, which may be of any desired type, of the transmission and reception branches, to each other, and to the antenna or the antenna output, makes it possible to design the module for a multitude of mobile radio systems with the corresponding branches, which comply with at least two different transmission standards, for example, the already mentioned GSM standard or a WCDMA mobile radio system.

In one embodiment, the module represents matching elements for each of the branches that can be connected for each one of the outputs of the switch. These matching elements can be matching elements or networks that are usable for matching, and sometimes they may represent complex impedances. The matching elements can serve the function of ensuring the desired phase rotation between the transmission branch and the reception branch of the mobile radio system duplexed in the FDD mode. A simple matching system can also be a line whose electrical length is matched, or another electrical connection, where the associated line inductance is used as a matching element.

Because, in the module according to the invention, a matching element is associated with each one of the two branches, the overall matching between the transmission branch and the reception branch of the mentioned FDD mobile radio system can be divided over the two branches or over the matching elements associated with them.

The matching elements can also ensure an impedance matching to a standard impedance of the circuit environment or of the filters, and also carry out, for example, an impedance transformation.

It is also possible to use the matching elements for the compensation of parasitic elements that are usually unavoidable due to the spatial extent of the switch.

A specially designed matching element is provided in the module between the transmission branch and the switch output, and it carries out a phase rotation in such a way that signals located outside the pass band of the transmission filter, which are reflected in the transmission filter, interfere with the "original signal" and are erased in the process. This embodiment is advantageous for transmission filters designed as low pass filters.

Moreover, the matching elements can be designed in such a way that, in certain switch positions, where several branches are connected simultaneously to the antenna, mutual interferences of the elements in the corresponding interconnected branches can be suppressed or avoided by regulating appropriate phase relations by means of these matching elements. In this way, a multiplex operation becomes possible.

For example, it is possible in this way to connect the two branches of the first mobile radio system and at least one transmission branch or reception branch of an additional mobile radio system together to the antenna in such a way that a triplexer operation is possible via the integrated matching elements in the module. Higher multiplexing is also possible via matching. Thus, quintplexer systems are known, which connect five different branches or five filters together with appropriate matching to each other and to an antenna, and which can be implemented here also with the central multiswitch as a central and/or connection element.

The matching elements are preferably integrated partially or completely in the module substrate. For this purpose, the latter presents a multiple layer structure comprising several metallization planes that are separated by insulating intermediate layers. The metallization planes are structured so that they form passive components, for example, resistances, phase lines, capacitances or inductances.

An additional embodiment of the invention makes it possible to firmly interconnect two transmission branches or two reception branches, or a transmission branch and a reception branch of different mobile radio systems, or a transmission branch and a reception branch of the same mobile radio system in the switch, and to connect these two connected branches via a single switch position or via the throwing of an individual switch simultaneously to the antenna, so that, in this way, as well, a diplex transmission operation or a diplex reception operation or a duplex operation is possible. Here, the fixed wiring allows the elimination of an individual switch.

It is also possible to implement, by means of fixed wiring that runs through the switch, a higher multiplexing of branches that may also be of different types, with a switch position of an individual switch. With the help of the matching elements that are associated with each output and thus with each branch, a diplex operation can become possible, without interference, even for closely adjacent frequency bands or corresponding transmission or reception branches that are associated with these bands. The same, naturally, also applies to branches with frequency bands far from each other.

In an embodiment of the module, the outputs of the transmission and reception branches of a mobile radio system duplexed in the FDD mode are firmly interconnected. Thus, it is possible to connect this connection to the antenna with the help of an individual switch in a switch position of the switch, and thus to simultaneously connect the transmission branch and reception branch to the antenna via the individual switch.

The switch can be a semiconductor component that comprises switch transistors, which respectively fulfill a single switch function and are capable of opening or closing an electric circuit. The switch transistors can be controlled via a switching line. Each of the transistors is controlled here with a separate switching line. Accordingly, the module presents a number of switching lines that corresponds to the number of switch transistors and, thus, to the number of individual switches.

However, it is also possible to provide a decoder in the module, which is controlled with a number of control lines that is smaller than the number of switching lines. Via the control lines, a switch code can be transmitted, which corresponds to a switch position or a combination of switch positions. In the decoder, the code is converted, and the switch transistors corresponding to the code or their switching lines are controlled.

A multiswitch comprising such a transistor can be formed in CMOS, bipolar or pHEMT technology, in silicon, silicon-germanium, GaAs or SOI substrates. However, it is also possible to design the switch as an electromicromechanical system or MEMS system, which implements the switch function in a mechanical way. Such a MEMS switch can function, for example, according to the capacitor principle, where the appropriate switch connection can be established or undone by the electrostatic attraction between a movable contact tongue and a fixed switch contact.

If one uses a multilayered module substrate, then the filters for the transmission branches can be designed as low pass filters and integrated in the form of LC filters in the substrate. The L and C elements required for this purpose are implemented here as inductances and capacitances by appropriately structured metallization planes.

The module can also be expanded with the reception branches and the reception filters arranged therein, where the reception filters are formed preferably as SAW or BAW filters. Both filter types can be implemented with low insertion loss and, moreover, they can present an incorporated balun function that makes it possible to deliver or convert the signals that have been applied from the side of the antenna single-ended into the reception branches as symmetrical signals to a series connected RF-IC with symmetric signal processing, or convert them. A separate balun is then superfluous.

In an additional higher integration step, the module comprises moreover power amplifiers, which are arranged in the transmission branches and also in or on the module substrate.

An even higher integration step is provided by a module that comprises a receiver IC and a transmitter IC, which can be designed in an additional construction step as a single transceiver component.

If desired, the module can comprise directional couplers, which are each arranged between the power amplifier and the FDD duplexed transmission filter.

The module can be designed for transmission branches and reception branches of the currently operated four GSM mobile radio systems and for at least three WCDMA mobile radio systems, and it can be equipped, as desired, with the appropriate transmission filters and reception filters.

The module according to the invention with the individual branches that run together centrally on the multiswitch allows, in a simple way, the connection of almost any high number of branches to the switch without producing an increase in coupling, because the module helps prevent conductor crossings of branches of different types. As the number of branches increases, the number of possible mobile radio systems and other wireless standards also increases, which can be processed at least on the reception side by the module according to the invention. Such additional wireless communication standards provided exclusively for reception can be, for example, reception branches for GPS, DMB, DVBH and others.

According to an embodiment of the invention, it is indeed possible to connect all the branches required for different operating systems, mobile radio standards and other communication standards individually to the switch, and potentially to connect them also individually. However, it is also possible, for the purpose of lowering the complexity, to use two or more branches, or only their components that are arranged in them, such as, for example, filters, jointly for several mobile radio systems. This applies particularly to reception filters arranged in reception branches, which, in the case of overlapping frequency bands, can be used for the reception branches of different mobile radio systems and mobile radio standards.

BRIEF DESCRIPTION OF DRAWINGS

Below, the invention is explained in greater detail in reference to embodiment examples and the associated figures. The figures are purely schematic representations, which serve only to improve the understanding of the invention.

FIGS. 12A, 12B and 12C, collectively as FIG. 12, show several possibilities of arranging the components of a module on a substrate SU.

The following reference symbols can be used in conjunction with the drawings:

| | |
|---|---|
| MS | Multiswitch |
| EFG | GSM reception filter |
| EFW | WCDMA reception filter |
| DPW | Duplexer for WCDMA |
| PAW | Transmitter amplifier for WCDMA |
| PAG | Transmitter amplifier for GSM |
| LNAW | Low-noise receiver amplifier for WCDMA |
| RKW | Directional coupler for WCDMA |
| WCDMA TX | Input for WCDMA on the transmitter IC |
| GSM TX | Input for GSM on the transmitter IC |
| GSM RX | Input for GSM on the receiver IC |
| WCDMA RX | Input for WCDMA on the receiver IC |
| RF IC | Common transmission and receiver IC |
| SZ1-SZ5 | Transmission branches |
| EZ1-EZ6 | Reception branches |

-continued

| | |
|---|---|
| $AE_{1S}$ | First matching element (transmission branch) |
| $AE_{2E}$ | Second matching element (reception branch) |
| AG | Output of the multiswitch MS |
| MD1-MD4 | Differentially integrated modules |
| ANT | Antenna |
| STL | Control line |
| SL | Circuit line |
| DC | Decoder |
| T1-T12 | Individual switches, for example, transistors |
| SF | Transmission filter |
| EF | Reception filter |
| BD | Bond wire |
| SU | Substrate |
| SBE | Circuit component |
| LNA 1, 2 | Common transmitter amplifier |

DETAILED DESCRIPTION

Figure 1:
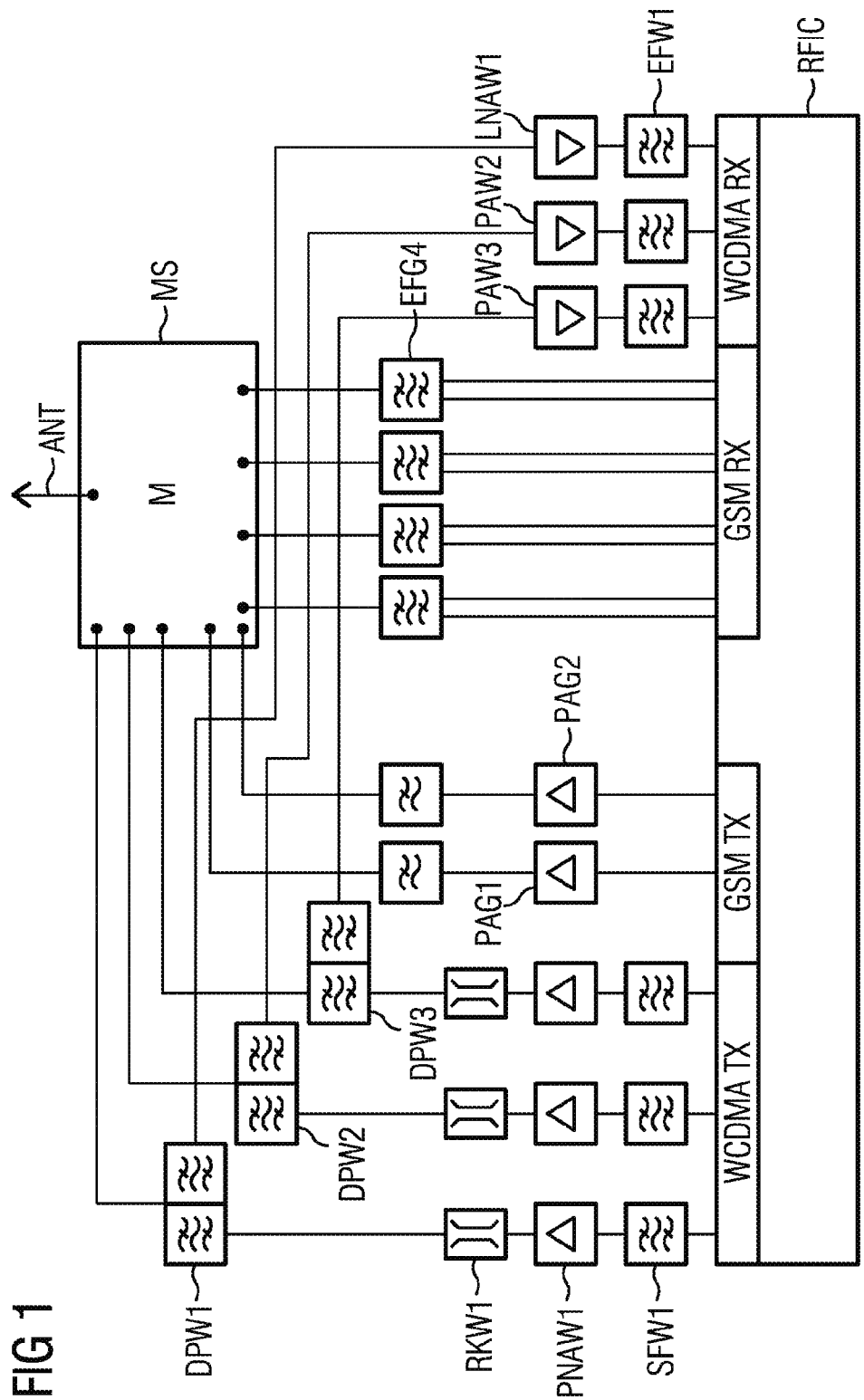
FIG. 1 shows the connection of components in a known front end.

FIG. 1 shows the connection of the components of a front end in a mobile radio device, as used in known technology. Here as well, the central element is a multiswitch MS, which connects the antenna ANT as desired to one or several outputs that feed into the corresponding branches of the front end. Thus, for example, the four outputs represented at the bottom of the figure of the multiswitch MS are assigned to the reception branches of four GSM mobile radio systems. In each reception branch, a reception filter EFG1 to EFG4 is arranged. The branches feed into the reception part of a transceiver-IC RFIC.

In the figure, on the left side of the multiswitch MS, three outputs are represented, which are provided for three WCDMA mobile radio systems, which are each connected to a duplexer DPW1, DPW2, DPW3. The two lowermost outputs on the left side of the multiswitch MS each lead into a transmission branch for the four GSM mobile radio systems. While for the GSM systems, a spatial separation of transmission and reception branches is possible, at the duplexers of the WCDMA systems a branching into transmission and reception paths occurs, both are led respectively to the corresponding transmitter or receiver IC or, as here, to a transceiver-IC RFIC that combines the two functions. These ICs take over the signal processing for all the mobile radio systems, but they are separated for better decoupling internally into a receiver part (receiver IC) and transmitter part (transmitter IC). The separated feeding, as a result of the branching site on the duplexers, causes, however, a crossing of the corresponding transmission and reception branches, and thus an increased coupling.

Figure 2:
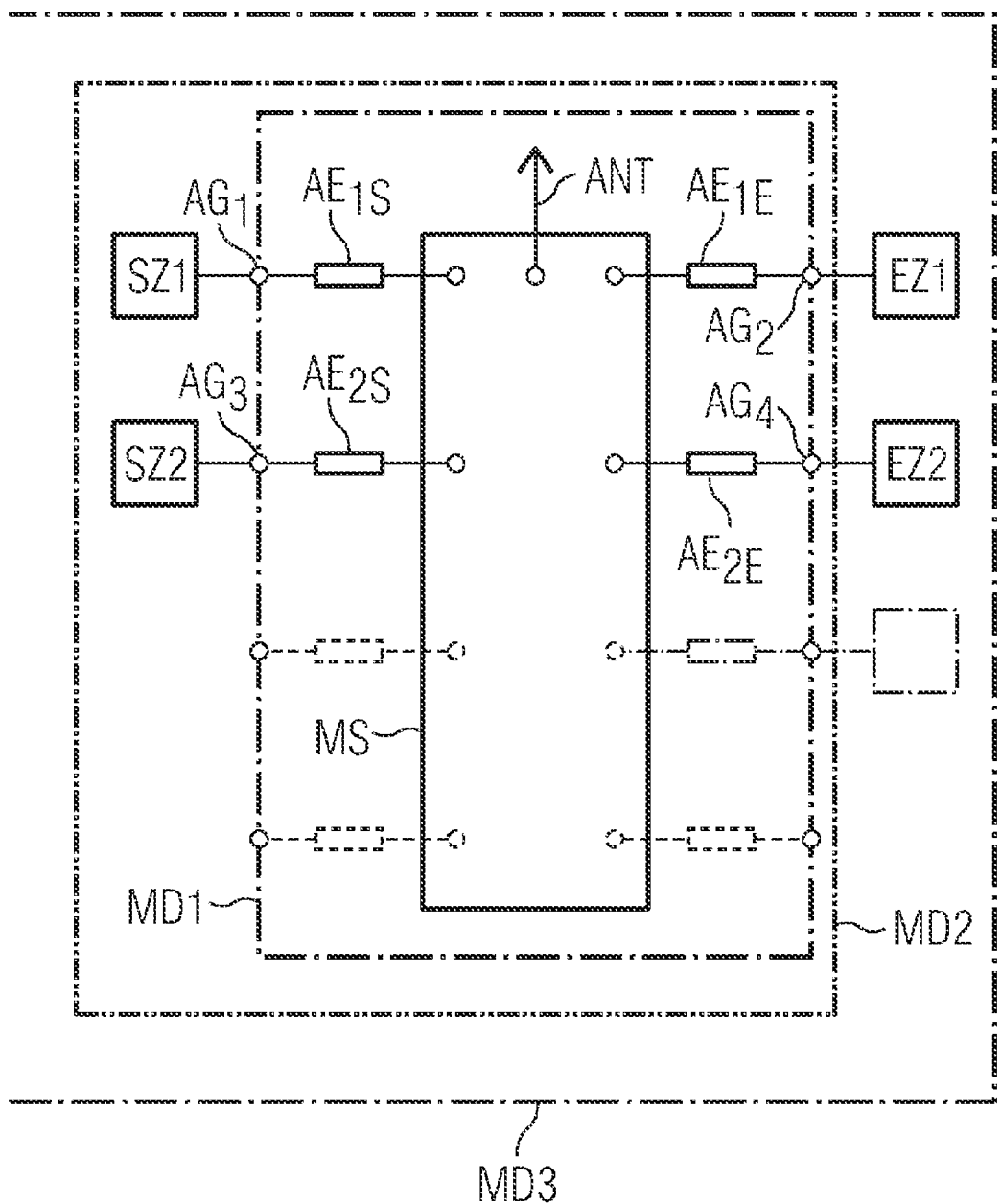
FIG. 2 shows schematically a module according to the invention.

FIG. 2 shows schematically a simple embodiment of the new proposed module. The multiswitch MS connects the antenna ANT as desired to one or more outputs, to which the transmission branches and reception branches of different mobile radio systems are connected. In the multiswitch MS, matching elements AE are integrated, which are series connected in the case of the appropriate switch position between the antenna and the connected branch. Thus, for example, a first transmission branch SZ1 is connected to an output AG1 of the switch MS. Via a first transmission-side matching element $AE_{1S}$, this first transmission branch can be connected to the antenna. A first reception branch EZ1 can be connected to a second output AG2, and it can be connected via a reception-side matching element $AE_{1E}$ to the antenna ANT.

The multiswitch presents at least one additional pair of outputs AG3, AG4, to which an additional transmission branch SZ2 and an additional reception branch EZ2 are connected. At least one pair of a transmission branch and connection branch is here associated with a mobile radio system, which works according to the frequency duplex method and therefore requires a duplexing of the transmission signals and reception signals. In contrast to the known arrangement represented in FIG. 1, the switch according to the invention allows the spatial separation, directly at the multiswitch MS, of the outputs AG for transmission branches and reception branches, so that the corresponding branches can also be led separately according to type, without the possibility of increased coupling occurring between branches of a different type.

It is preferable for the module with the multiswitch to present additional outputs by means of which the additional branches can be connected to the antenna ANT via, in each case, a matching element in an appropriate switch position. GSM systems, WCDMA systems or other mobile radio systems can be associated with the transmission branches and reception branches. However, it is also possible to provide on the multiswitch MS, outputs and corresponding matching elements AE for information services or satellite navigation systems that are to be transmitted wirelessly on one side and require in each case only one reception branch, or to provide reception branches for radio or television reception or additional multimedia services at these outputs.

The simplest module MD1 comprises the switch MS including the matching elements associated with the individual outputs. In an additional integration step, a module MD2 can also comprise the transmission branches, particularly the transmission filters arranged therein. For example, a module MD3 with even higher integration can also comprise, besides the transmission branches, the reception branches or the reception filters arranged therein. In the transmission and reception branches and thus within the corresponding modules MD, corresponding amplifiers and directional couplers can also be integrated.

Figure 3:
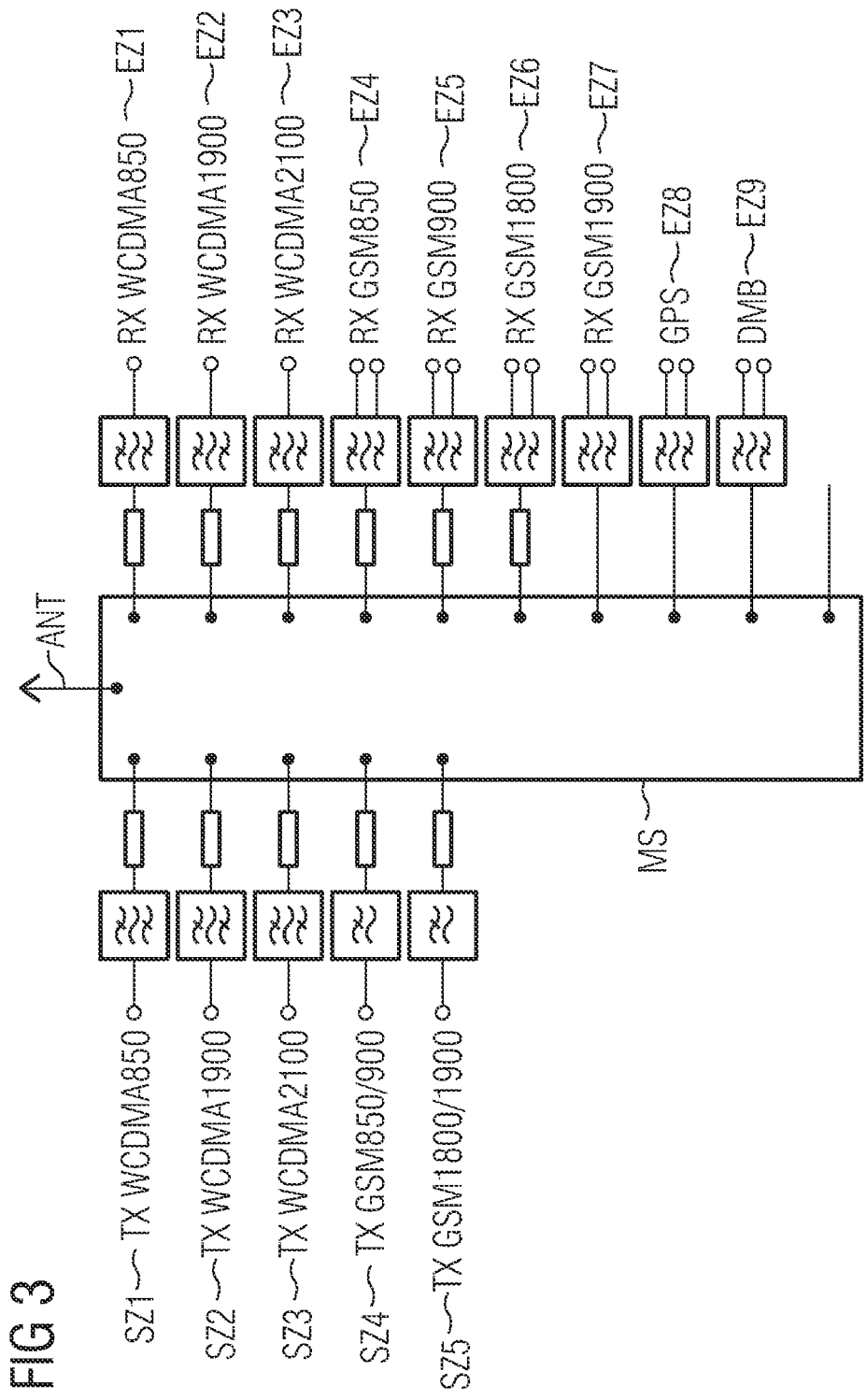
FIG. 3 shows schematically a possible architecture of a front end with the module according to the invention.

FIG. 3 shows a possible architecture of a front end, which is possible with the proposed module. The multiswitch MS presents, on the left side, five outputs AG for five transmission branches, which can be connected independently from each other individually or in groups to the antenna ANT. A matching element $AE_S$, which is arranged between the antenna and the corresponding output, is associated with each output.

On the right side, ten outputs AG6 to AG15 for reception branches are arranged, where the corresponding, optionally mutually independent, transmission branches can be connected individually or in groups to the antenna. On the reception side, a matching element $AE_e$ is associated with each output. On the reception side, for each of the integrated mobile radio systems, a separate output and a special separate reception branch are provided. Thus, for example, with the three first reception-side outputs (shown in the figure at the top right), three reception branches for three mobile radio systems duplexed in the frequency duplex method are connected, for example, the reception branches for WCDMA 850, 1900 and 2100. Moreover, four reception branches are provided here for different GSM mobile radio systems, in this case for GSM 850, GSM 900, GSM 1800 and GSM 1900. Each of the mentioned reception branches here contains a bandpass filter, which can be designed, for example, as an SAW filter or as a BAW filter.

Another actually represented output is connected to the reception branch for GPS signals, in which a bandpass filter is also arranged. An additional output is connected to the reception branch for a multimedia reception, for example, for DMB, which is the digital video standard for mobile communication devices. An additional output AG15 of the multiswitch MS, which is represented at the far bottom on the right, can be connected to any desired other reception branches for mobile radio systems, information services, navigation services or multimedia services.

In contrast to the reception branches, which are provided in a number corresponding to the number of mobile radio standards to be operated, several transmission branches can use elements jointly. Thus, mobile radio systems in particular can be designed with close transmission bands, for example, common transmission filters, which can be designed as a rule as low passes. Bandpass filters with corresponding band widths are also suitable as transmission filters.

In FIG. 3, for example, the GSM transmission branches for GSM 850 and GSM 900 are integrated in a common branch SZ4, and they use a common transmission filter, which is connected to a unique output of the multiswitch MS via a corresponding matching element. The close together GSM transmission bands for GSM 1800 and GSM 1900 can use a common branch SZ5 and a common transmission filter arranged therein as a low pass, and they can be connected to a common output of the multiswitch MS.

The three additional transmission branch SZ1 to SZ3, which are represented in the figure, are each associated with one of the frequency duplexed mobile radio systems, particularly the WCDMA system. For example, WCDMA850 (SZ1), WCDMA1900 (SZ2) and WCDMA2100 (SZ3). Here each system requires its own transmission filter, because the duplex operation required for these systems requires a bandpass filter as transmission filter and a phase and/or impedance matching to the corresponding RX filter. In addition, to allow frequency duplex operation even with the reception filter, a matching element tailored to the given appropriate transmission band of the same system is used, so that an appropriate impedance and phase matching are ensured between the transmission and reception filters. As a result of the modular division of the matching elements to the individual branches, one can produce branches completely separate from each other.

Figure 4:
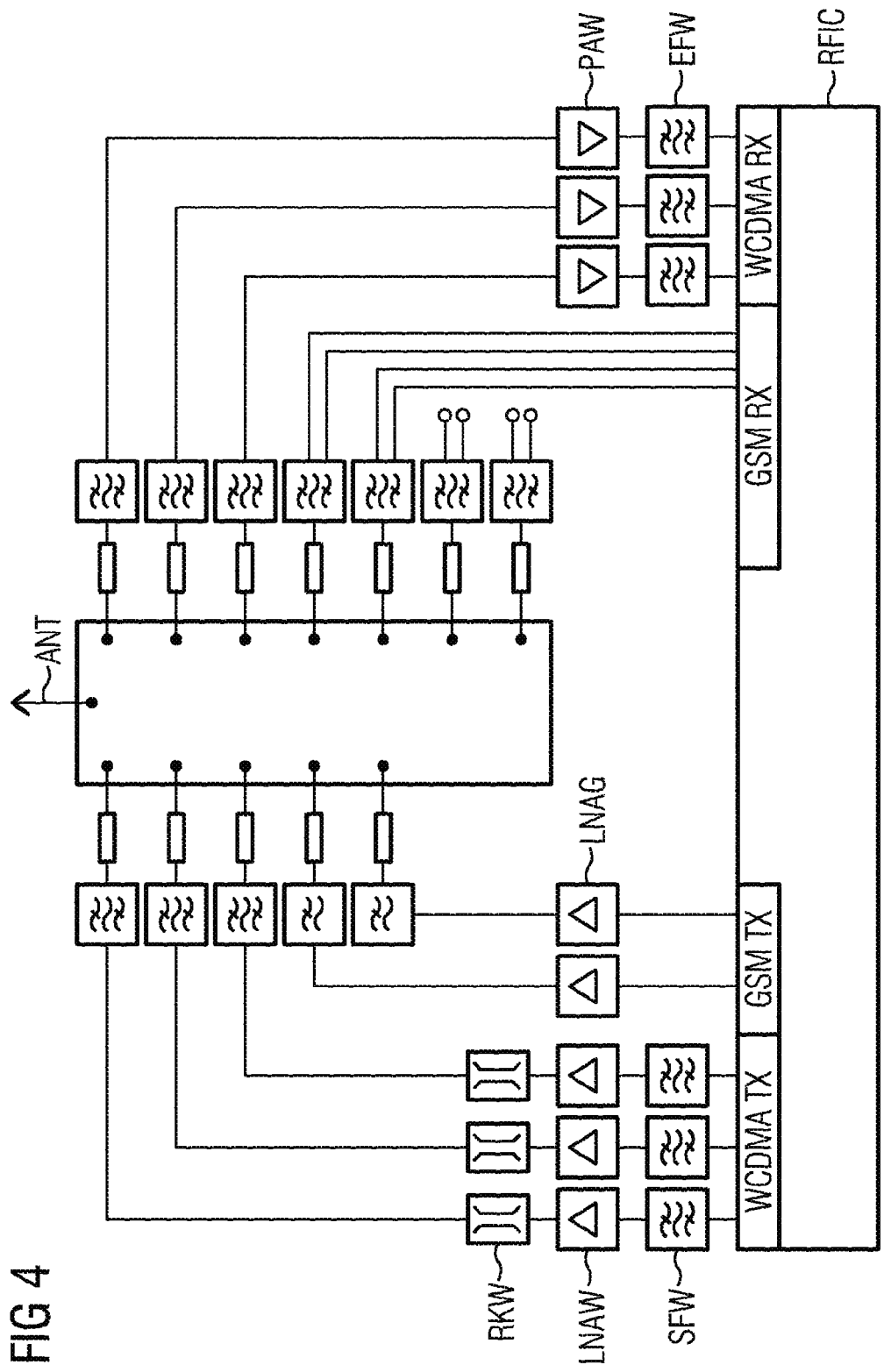
FIG. 4 shows the complete architecture of a front end with a multiswitch module.

FIG. 4 shows the complete architecture of the front end with the multiswitch module as represented, for example, in FIG. 3. In addition, in this figure, the transmission and reception branches are represented completely with their corresponding components. The branches all feed into a corresponding transmitter or receiver IC or, as represented in FIG. 4, into a common transceiver IC RFIC. This integrated transmission and reception component has transmission and reception functions spatially separate from each other, and also the corresponding input. With the module according to the invention, it is possible to apply the branches, in accordance with their function, separately from each other without crossing over the corresponding input on the corresponding side of the transceiver IC.

Besides the input-side filters that have already been described, the transmission branches here present, at least for the frequency duplex WCDMA mobile radio systems, in each case also a directional coupler RKW, a low-noises transmitter amplifier PAW, and a second transmission filter SFW. This second transmission filter SFW can be omitted in the case of appropriately sufficient quality of the first transmission filter. In the reception branches, a receiver amplifier LNA, and optionally a second reception filter EFW, are provided for each frequency duplex WCDMA mobile radio system. The reception branches for the GSM systems can be fed directly into the corresponding RF semiconductor component, for example, into the integrated transceiver RFIC, in which the amplification of the GSM RX signals can be carried out. The second reception filter can also be arranged, in the case of low-noise amplifiers LNA integrated in the receiver and/or transceiver IC, in an additional circuit loop led out of the IC.

For the reception branches of the GSM mobile radio system, an additional embodiment is represented in the figure, namely the BALUN function integrated in the reception filter. The asymmetric (single ended) signal arriving at the antenna is converted in the reception filter with BALUN function into two mutually symmetric signals applied to the output of the reception filter, which can now be applied to a symmetrically working amplifier within the transceiver IC RFIC. Because symmetric amplifiers present technical advantages with respect to asymmetrically operating amplifiers, this design is particularly preferred. The reception filters with BALUN function allow the use of a symmetric amplifier without additional BALUN.

Figure 5:
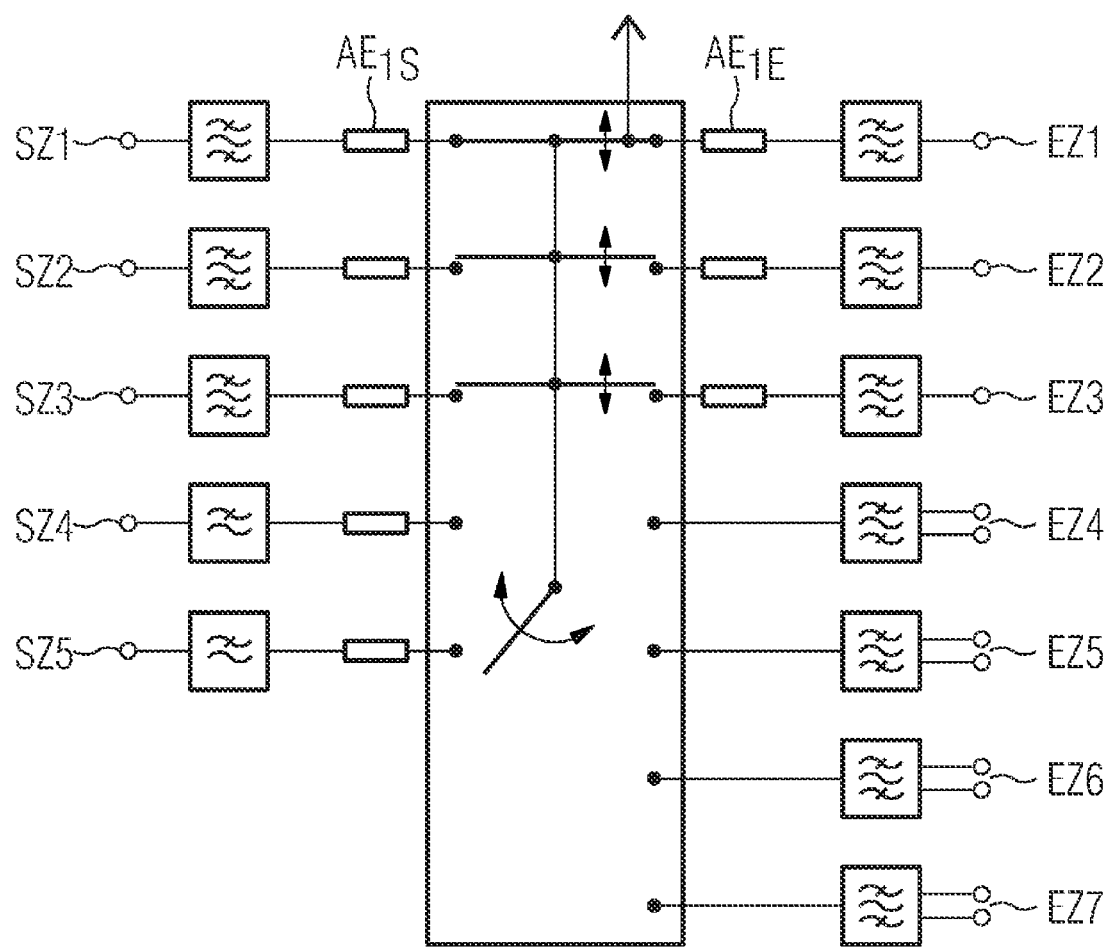
FIG. 5 shows a subdivided multiswitch.

In FIG. 5, a schematic representation of the multiswitch MS illustrates how different connections can be implemented therein. Analogous to the multiswitches according to the invention that have been represented so far in FIGS. 3 and 4, in each case, the three upper outputs of the switch are assigned to the transmission side (left) and reception side (right), in each case in a frequency duplexed mobile radio system. This requires simultaneous transmission and reception, which is possible only if the transmission branch and reception branch of the corresponding mobile radio system are connected simultaneously to the antenna. Accordingly, the multiswitch MS allows, for the first three pairs of transmission and reception branches of the frequency duplex system, only those switch positions that allow the simultaneous connection of corresponding pairs to the antenna. This part of the multiswitch with the antenna output and the three pairs of transmission and reception branches (for example, for the WCDMA systems) can be designed as so-called three-on-three switches.

For the remaining outputs or for the remaining as yet unconnected mobile radio systems with time delayed transmission and reception (TDD duplex method), it may be sufficient, at a given time, to connect in each case only one branch, chosen from the transmission and receive leg, to the antenna. For this purpose, for example, an SP6T switch is appropriate, which connects the antenna as desired to one of the six remaining outputs represented in FIG. 5. These outputs are connected here to two transmission branches and four reception branches.

Figure 6:
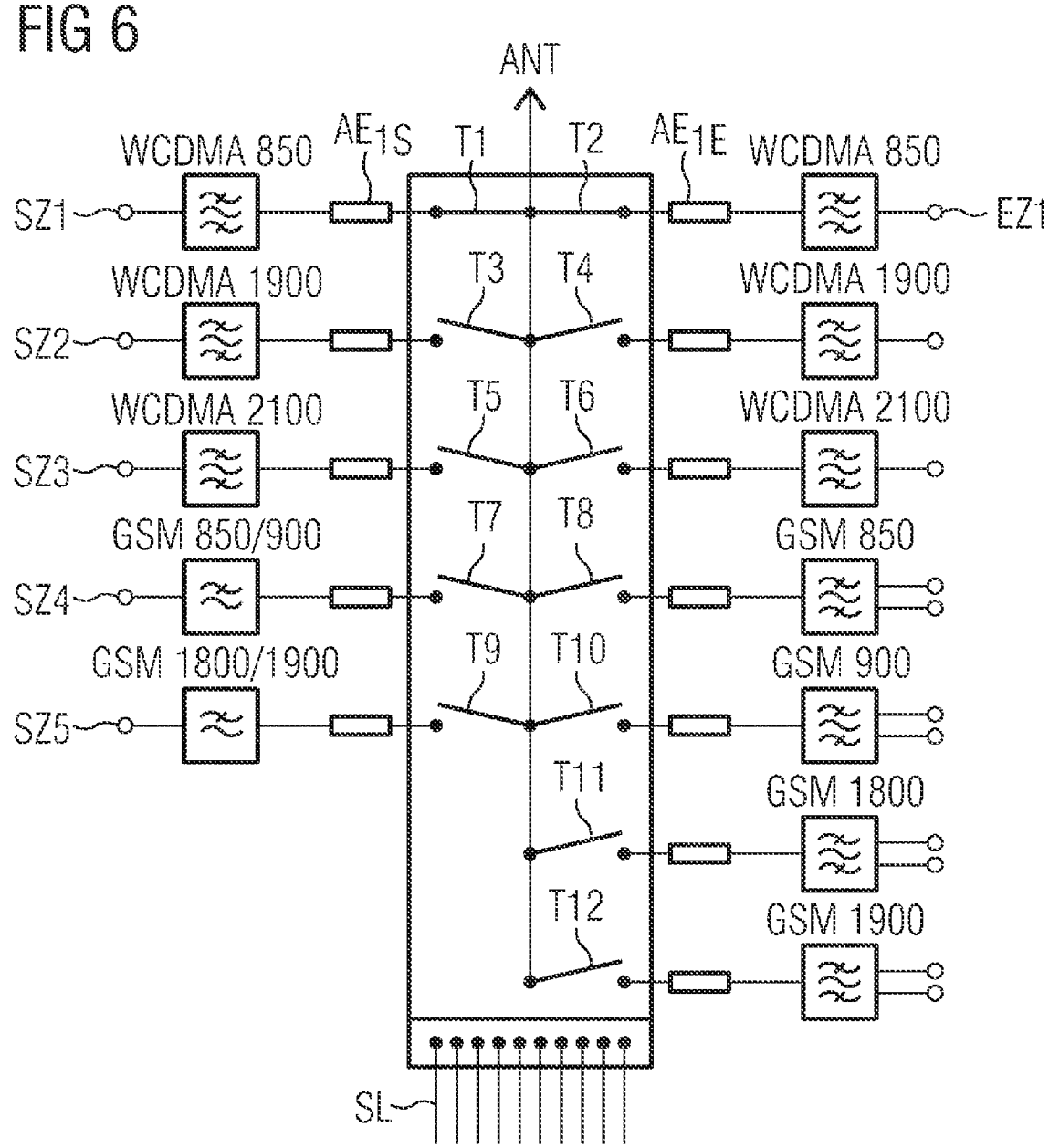
FIG. 6 shows an additional multiswitch with switching lines.

FIG. 6 shows a multiswitch MS connected to transmission and reception branches whose twelve outputs can be connected independently of each other to the antenna ANT. The control of the switch occurs via the switching lines SL, where, for each separately controlled output, a separate switching line SL is provided. Each switching line can switch on or off a single switch designed, for example, as a transistor T, by applying an appropriate switch signal to the single switch. As a result, each output can be controlled separately and independently of the others individually or in groups. This allows a variable combination of switch positions, although, for frequency duplexed mobile radio systems, naturally only the simultaneous connection of the corresponding transmission and reception branches is reasonable. In the figure, for example, the uppermost pair consisting of a transmission branch SZ1 and a reception branch EZ1 is connected to the antenna ANT. For the represented embodiment, an SP12T switch can be used.

Figure 7:
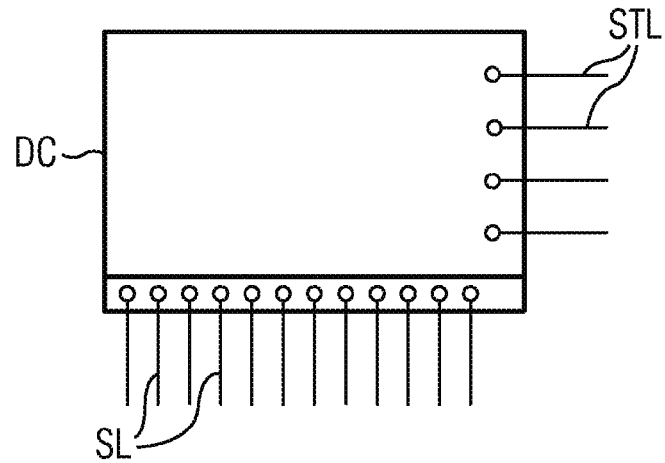
FIG. 7 shows the structure of a decoder.

A decoder can be provided, integrated in the multiswitch MS or connected as a discrete component to the latter, which uses, in practice, a smaller number of possible switch combinations, to control the multiswitch MS with a number of control lines that is reduced in comparison to the number of switching lines. Codes corresponding to certain control combinations can be transmitted via the control lines. The decoder translates these codes and applies the appropriate signals, which correspond to the desired switch position combination, to the switching lines. FIG. 7 shows, for example, the structure of such a decoder DC in a schematic representation. In the bottom of the representation, the switching lines SL are provided in a corresponding number for the independently operating twelve individual switches. On the right side of the decoder DC, control lines STL are represented, whose number is lower compared to the number of switching lines. For the SP12T switch of FIG. 6, the twelve switching lines SL can be operated, for example, with only four control lines STL, so that a paired switching of the transmission and reception branches for three mobile radio systems (according to the frequency duplex method) is possible, while the six remaining outputs in each case can be controlled only individually. One possible simple logic circuits for such a decoder is represented in the following table:

| Function | C1 | C2 | C3 | C4 | T1 | T2 | T3 | T4 | T5 | T6 | T7 | T8 | T9 | T10 | T11 | T12 |
| --- | --- | --- | --- | --- | --- | --- | --- | --- | --- | --- | --- | --- | --- | --- | --- | --- |
| TX GSM850/900 | 0 | 0 | 0 | 1 | 0 | 0 | 0 | 0 | 0 | 0 | 1 | 0 | 0 | 0 | 0 | 0 |
| TX GSM1800/1900 | 0 | 0 | 1 | 0 | 0 | 0 | 0 | 0 | 0 | 0 | 0 | 0 | 1 | 0 | 0 | 0 |
| RX GSM850 | 0 | 0 | 1 | 1 | 0 | 0 | 0 | 0 | 0 | 0 | 0 | 1 | 0 | 0 | 0 | 0 |
| RX GSM900 | 0 | 1 | 0 | 0 | 0 | 0 | 0 | 0 | 0 | 0 | 0 | 0 | 0 | 1 | 0 | 0 |
| RX GSM1800 | 0 | 1 | 0 | 1 | 0 | 0 | 0 | 0 | 0 | 0 | 0 | 0 | 0 | 0 | 1 | 0 |
| RX GSM1900 | 0 | 1 | 1 | 0 | 0 | 0 | 0 | 0 | 0 | 0 | 0 | 0 | 1 | 0 | 0 | 1 |
| WCDMA2100 | 1 | 0 | 0 | 0 | 0 | 0 | 0 | 1 | 1 | 0 | 0 | 0 | 0 | 0 | 0 | 0 |
| WCDMA1900 | 1 | 0 | 0 | 1 | 0 | 0 | 1 | 1 | 0 | 0 | 0 | 0 | 0 | 0 | 0 | 0 |
| WCDMA850 | 1 | 0 | 1 | 0 | 1 | 1 | 0 | 0 | 0 | 0 | 0 | 0 | 0 | 0 | 0 | 0 |

C1 to C4 denote the signal occupancies for the four control lines, while in columns T1 to T12, the switch signals applied to the corresponding individual switches (for example, the individual transistors) and transmitted via the switching lines are represented. Using the represented four control lines, a maximum of sixteen different switch combinations can be produced. For a higher number of possible switch combinations, a higher number of control lines is required, for example, five control lines for thirty-two switch combinations or six control lines for sixty-four switch combinations.

Figure 8:
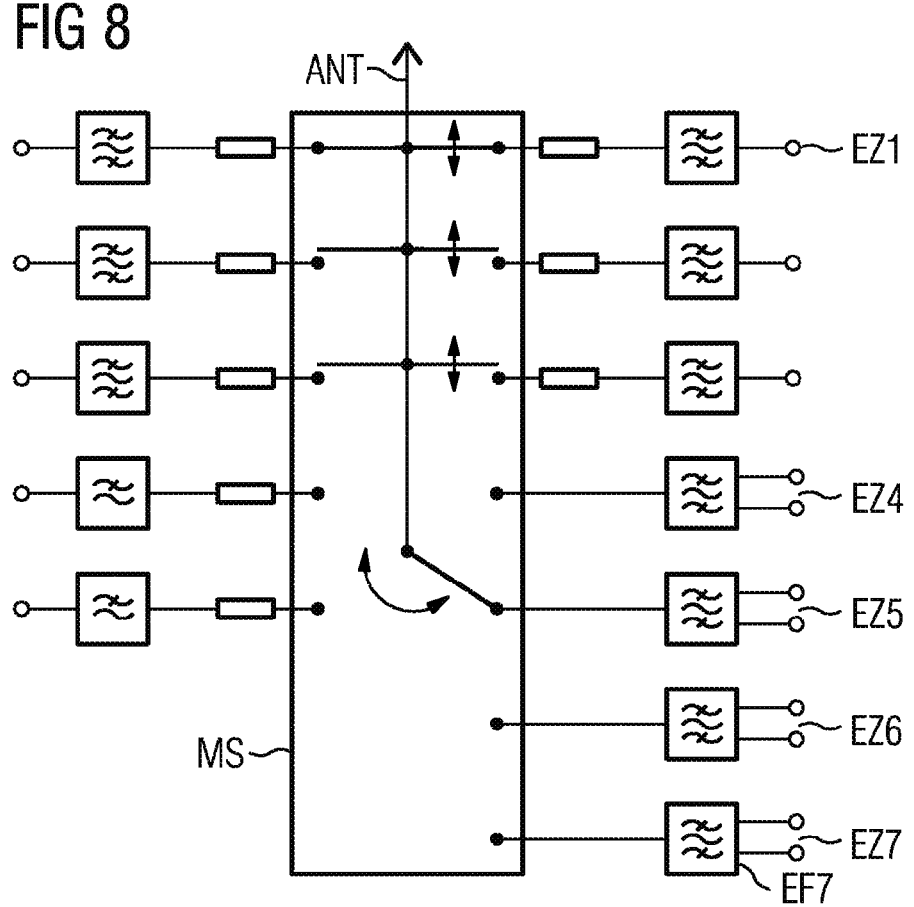
FIG. 8 shows an additional embodiment of a module with a subdivided multiswitch.

FIG. 8 shows an additional embodiment of a module with a multiswitch MS, which is formed similarly to the arrangement of FIG. 5, while additionally opening the possibility of connecting to the antenna, in addition to a pair of each transmission and reception branch of a frequency duplexed mobile radio system, simultaneously a reception branch of a GSM system. In the represented switch position, the system functions as a triplexer, because three branches can be operated independently of each other. This requires a phase-correct matching via the corresponding matching elements AE, which, on the one hand, allow a undisturbed duplex operation and, in parallel, the undisturbed receiver operation of the GSM system. In this way, it is possible to monitor simultaneously a call connection in the frequency duplexed mobile radio system and, in parallel, monitor the GSM channel for potentially arriving calls. It is even possible, during operation, to regularly switch this individual switch for the individually switchable reception branches of GSM systems, in such a way that a simultaneous respectively temporally delayed, but continuously alternating monitoring, on several GSM reception branches is possible.

In addition, the reception filters EF4 to EF7 of the reception branches EZ4 to EZ7 are provided with integrated BALUN functionality, which allows a symmetric further processing of the Rx signals in a symmetric amplifier.

Figure 9:
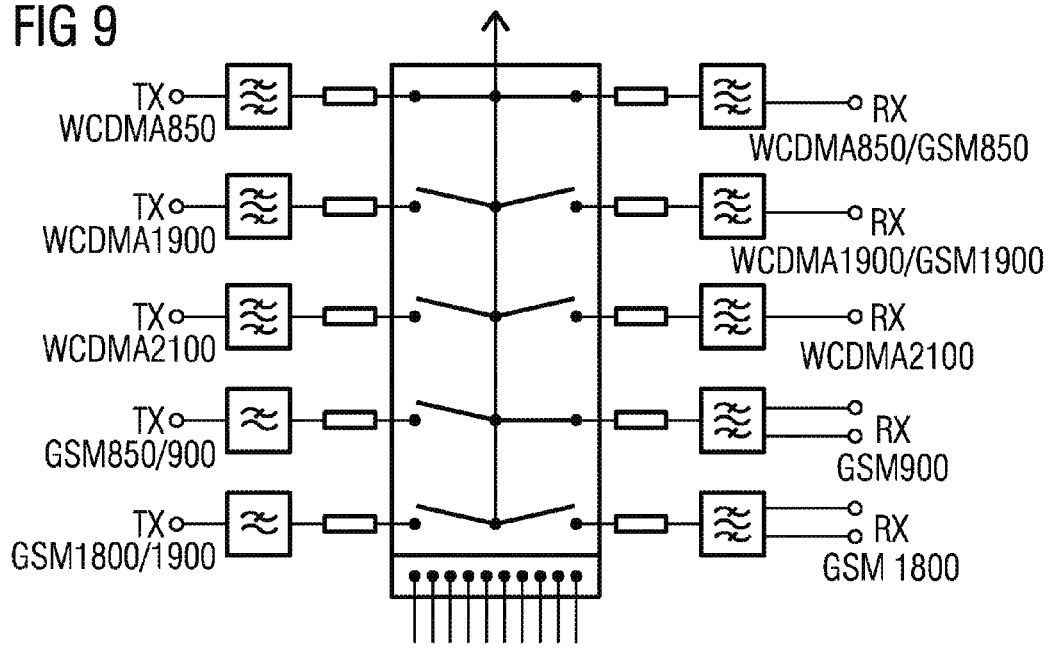
FIG. 9 shows a simplified switch module, in which several transmission branches and independently thereof several reception branches are combined with each other.

FIG. 9 shows a switch module, which mutually combines, in an additional simplification, several transmission branches and, independently thereof, several reception branches, and connects them via a common output to the multiswitch MS. A total of five transmission branches SZ1 to SZ5 and five reception branches EZ1 to EZ5 are provided. The fourth transmission branch SZ4 is here designed as a common transmission branch for mobile radio systems GSM 850 and GSM 900. Similarly, the fifth transmission branch SZ5 is designed as a common transmission branch for the two adjacent RX bands of GSM 1800 and GSM 1900, where the transmission filters are designed for the fourth and fifth transmission branches SZ4, SZ5 in each case as low pass filters.

The module can also use a common reception branch for two mobile radio systems with closely adjacent RX frequency bands. In the embodiment according to FIG. 9, the first reception branch EZ1 is designed, for example, for reception in the WCDMA 850 and GSM 850. The second reception branch EZ2 is designed for the simultaneously respectively common reception for WCDM 1900 and GSM 1900. The three remaining reception branches EZ3 to EZ5 are designed in each case for only one mobile system, in this case for WCDMA 2100 (EZ3), GSM 900 (EZ4) and GSM 1800 (EZ5).

The multiswitch MS can here be formed as an SP10T switch and operated with ten switching lines. As represented, the switch allows the maintenance of a frequency duplexed connection in a WCDMA system with simultaneous reception in a GSM system. During a call in a GSM system, one can then switch between the transmission branch and the reception branch of this system, while, in the process, the WCDMA branches may or may not be connected via the switch MS to the antenna ANT.

Besides the appropriate matching of the different branches connected to each other and to the antenna by the appropriate matching elements AE, in this embodiment the transceiver IC RFIC is designed in such a way that it supports the represented architecture. In the embodiment according to FIG. 9, the transmission and/or reception filters can be integrated together with the multiswitch in a module or they can be arranged discretely or separately. The same applies to all the architectures and embodiments presented here, represented in the figures.

Figure 13:
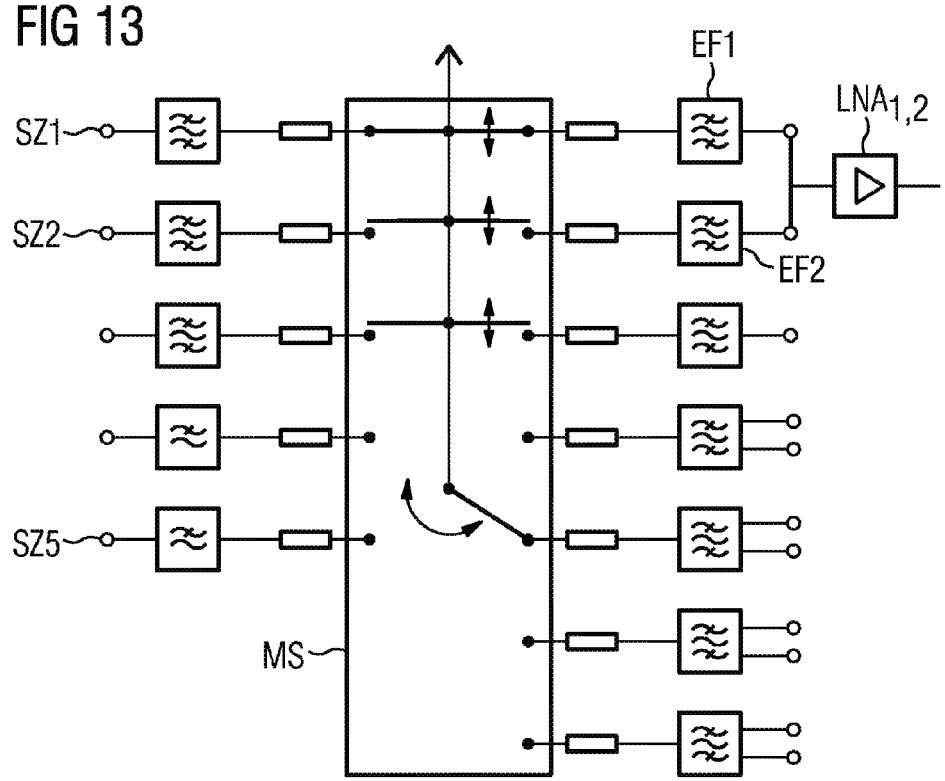
FIG. 13 shows a switch module with a common amplifier used by two branches.

The embodiment indicated in FIG. 13 makes it possible to use, both on the reception side and on the transmission side, in each case, one amplifier for two branches of the same time (Rx or Tx), and then to apply them to two separate or one common transmission or reception filter. As an example, the representation pertaining to additional combinations shows a receiver amplifier $LNA_{1,2}$ which is used jointly for the reception branches of two mobile radio systems and is connected to two reception filters EF1 and EF2. Each of the two reception filters can be connected independently of each other via the switch MS to the antenna. Thus, the two branches with the two reception filters EF1 and EF2 can use a common amplifier. For mobile radio systems with adjacent frequency bands, common amplifiers can be used without problem. Assuming appropriate broad-band amplifiers are available, this is also possible for mobile radio systems that are farther removed in terms of frequency.

Figure 11:
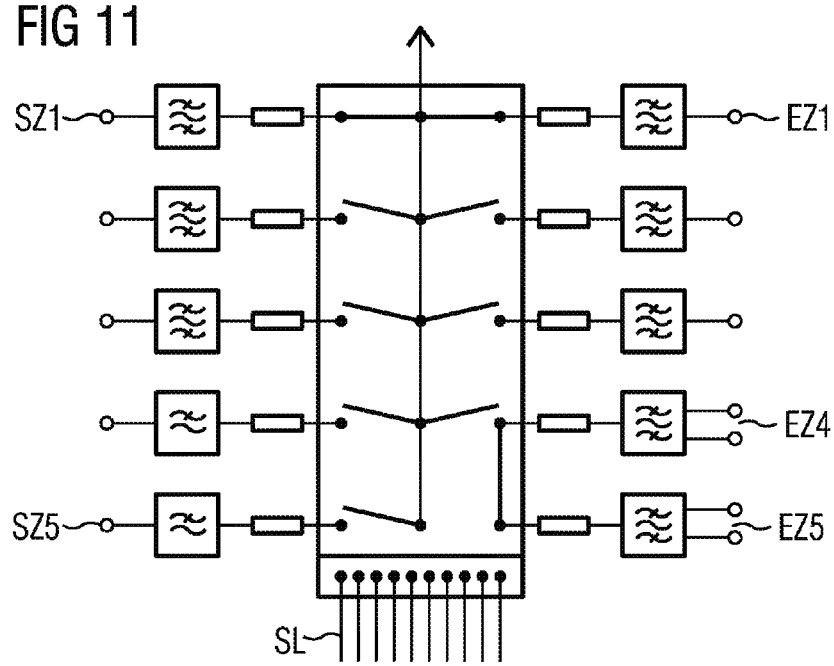
FIG. 11 shows an additional architecture of a switch module.

FIG. 11 shows an additional architecture of a switch module, which is formed similarly to the module of FIG. 9. In contrast to FIG. 9, however, the multiswitch MS here has only nine individual switches, which can be operated with nine switching lines, and which can establish connections to a total of ten transmission or reception branches. Two of the reception branches (in the figure, for example, the two reception branches EZ4 and EZ5 shown at the bottom on the right), however, are solidly connected to each other within the multiswitch MS, and they can be connected via a single switching process or a single switch jointly to the antenna, where, however, a matching element is integrated separately in the multiswitch for each of the connected reception branches. Via this switch position, a reception-side diplexer operation of the two connected reception branches EZ4 and EZ5 can be obtained. By means of an appropriate matching using the matching elements AE, this is also possible for two frequency bands separated far from each other in terms of frequency of the different mobile radio systems, for example, for the reception branches of GSM 900 and GSM 1800. Independently thereof, or additionally, an Rx branch and Tx branch of a frequency duplexed mobile radio system can present a fixed connection that leads through the multiswitch. By means of a single switch, this connection can be connected to the antenna, and thus ensure the duplexer operation.

Similar fixed connections through the multiswitch can also connect jointly switchable transmission and reception branches of different mobile radio systems, and can also connect via a single common individual switch to the antenna. Such fixed wirings can also implement a higher-grade multiplexer, which comprises more than two branches solidly connected to each other through the multiswitch, and connect the latter additionally with a single common individual switch to the antenna. This simplifies the multiswitch required for this purpose.

Figure 10:
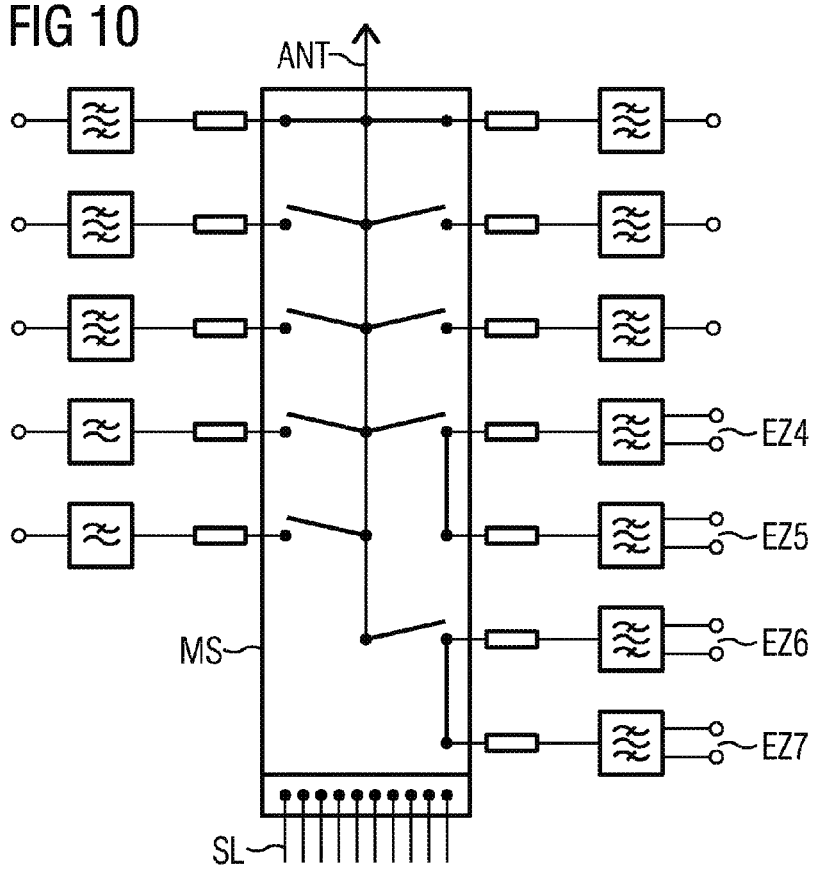
FIG. 10 shows a switch module with a reduced number of individual switches.

FIG. 10 shows an embodiment of a switch module, in which an embodiment according to FIG. 6 with a corresponding number of transmission and reception branches with the same assignment is provided. However, in comparison with the arrangement according to FIG. 6, the represented switch module is simplified by the number of switches reduced by two. In each case, two reception branches of GSM mobile radio systems far from each other are designed here in each case as a duplexer similarly to FIG. 11. Therefore, an SP10T switch can be used that is controlled with ten switching lines.

All the individual switches in the multiswitches of FIGS. 2-11 can be designed as individual transistors that, as a function of the signal applied to the switching line, open a current path or block it, and thus set the switch to ON or OFF. Such a transistor can be implemented in bipolar or CMOS technology or as a pHEMT element (=p-High Electron Mobility Transistor). The switch can be formed in silicon, silicon germanium, SOI or gallium arsenide substrates or heterojunction substrates. Alternatively, each of the individual switches can be designed as a microelectromechanical circuit component (MEMS switch).

FIG. 12 shows additional possibilities of how the components of a module can be arranged on a multiple layer substrate SU and connected to each other. FIG. 12A, for example, shows an arrangement in which, one or more transistors or MEMS switches of the circuit component SBE are applied and, for example, glued on the substrate. The circuit component is connected via bond wires BD to corresponding contacts on the upper side of the substrate SU. In the multiple layer substrate itself, corresponding connections are made and additionally passive components are integrated, which individually or in combination, form the corresponding matching elements of the multiswitch. The transmission filters SF and reception filters EF can be arranged on the same surface of the substrate SU and connected to the latter, for example, by flip chip mounting. It is also possible to connect the filters via bond wires to the substrate and, thus, also to the circuit component.

FIG. 12B shows an embodiment in which the switch component SBE is mounted in a flip chip design, so that contacting via bond wires can be omitted. The transmission and reception filters SF, EF can also be applied in a flip chip construction.

FIG. 12C shows an embodiment in which the circuit component SBE is arranged on the side of the substrate SU that faces the transmission and reception filters SF, EF. The flip chip mounting technology also allows the parallel electrical and mechanical connection. In addition, the circuit component SBE can also be arranged with embedding, like other components, on the substrate in a recess of the substrate SU.

The substrate SU for the module can be a laminate, where between organic dielectric layers, for switching operations, structured and mutually connected metallization planes are provided. The substrate SU can also be formed as an LTCC ceramic, an HTCC ceramic, or from glass, however, in each case, with a multiple layer structure presenting several metallization planes that are separated from each other by the corresponding dielectric layers. Within the multiple layer substrate, all matching elements can be formed as lines, inductances and capacitors. However, it is also possible, to arrange matching elements or parts of matching elements as discrete component elements on the surface of the substrate.

The module, with the components that are electrically contacting mounted on it, can be prepared by spraying or casting for the manufacture of the module.

Alternatively or additionally, the module can be provided with a shielding housing. However, it is also possible to arrange on the module, separate shieldings for the transmission branches and the reception branches, to provide an additional electromagnetic shielding between the transmission and reception branches.

The external connections of the module, by means of which the latter can be connected to a switching environment and, in particular, mounted on the board of a mobile radio apparatus, can also be formed as an LGA (Land Grid Array) or as a BGA (Ball Grid Array). It is also possible to form the contact pads of the module as castellations.

All transmission and reception filters, matching elements, circuit components or individual circuit transistors can be arranged using SMT technology, flip chip technology, or as bare die elements above or below on the substrate. Individual or several components can also be embedded in corresponding recesses within the substrate in so-called cavities, as represented in FIG. 12C.

The module according to the invention can present, as already mentioned, several integration steps, in which different additional elements can be arranged on the substrate or integrated within the substrate. At the highest integration step, the semiconductor component(s) for transmitter and receiver IC or for transceiver IC is (are) applied additionally on the substrate.

The invention is not limited to the embodiment examples represented in the figures. The scope of the invention also includes modules further modified in the number of branches connected to the multiswitch MS, with regard to the assignment of the different branches to corresponding mobile radio or other wireless communication or information systems, in different combinations of simplified architectures, considering the common use of transmission or reception branches or the common switching of different branches and the accordingly reduced complexity of the switch. The multiswitch can comprise circuit components, in which all the transistors required for the switching are integrated. The multiswitch can also comprise several transistor components, wherein the circuit function and circuit combinations are allotted to the two or more transistor components.

What is claimed is:

1. A module for mobile radio device, the module comprising: a multiswitch configured to connect outputs of the multiswitch for transmission and reception branches of different mobile radio systems to an antenna so that the module comprises transmission and reception branches of at least two mobile radio systems duplexed in the FDD mode, wherein the multiswitch allows synchronous operation of the module in a first mobile radio system and a second mobile radio system, wherein the first system is a FDD system and the second system is different from the first system;
   a first output of the multiswitch for connection of the transmission branch of the first mobile radio system duplexed in an FDD mode;
   a second output of the multiswitch for connection of the reception branch of the first mobile radio system, the second output being separate from the first output;
   a third output of the multiswitch for connection of the transmission branch of the second mobile radio system that is different from the first one; and
   a fourth output of the multiswitch for connection of the reception branch of the second mobile radio system,
   a fifth output of the multiswitch for connection of the transmission branch of a third mobile radio system that is different from the first and the second mobile radio systems, and
   a sixth output of the multiswitch for connection of the reception branch of the third mobile radio system,
   wherein the multiswitch comprises three of the above outputs on a first side of a switch that assigned to a transmission side and three other output on a second side of the switch that are assigned to a reception side of a respective frequency duplex mobile radio system each for connecting the respective branch to the respective output,
   wherein the switch is configured to provide only those switch positions that allow the simultaneous connection of corresponding pair of outputs to the antenna to allow simultaneous transmission and reception,
   wherein the part of the multiswitch with the antenna output and the three pairs of transmission and reception branches of the FDD duplexing mobile radio system is designed as a so-called three-on-three switch,
   wherein matching elements are integrated in the module to ensure FDD duplex operation for filters arranged in the transmission branch and reception branch of the first mobile radio system and are connected in this switch position to corresponding branches, wherein the matching elements are integrated in the module for each branch that can be connected to the outputs, wherein the matching elements comprise phase lines, inductances, capacitances, impedance matching networks or impedance transformation elements, and wherein a switch position is provided, in the multiswitch, wherein the switch position connects the transmission and reception branches of the first mobile radio system, as well as at least one transmission branch or reception branch of an additional mobile radio system to the antenna, so that a multiplex operation is possible via the integrated matching elements.

2. The module according to claim 1, wherein, at least two additional outputs for the respective transmission branch and reception branch of at least one additional mobile radio system are provided on the multiswitch, wherein at least two mobile radio systems comply with at least two different transmission standards.

3. The module according to claim 1, wherein the outputs for the transmission branches are arranged adjacent to each other but spatially separate from the outputs of the reception branches.

4. The module according to claim 1, wherein the multiswitch is mounted on a module substrate comprising a multiple layer structure with several metallization planes, structured in relays that comprise passive components chosen from resistance, phase line, capacitance and/or inductance.

5. The module according to claim 1, wherein outputs of two reception branches are connected to each other on a side of the multiswitch such that a diplexer reception operation is possible.

6. The module according to claim 1, wherein outputs of the transmission and reception branches of a mobile radio system duplexed in an FDD mode are connected integrally to each other, and the transmission and reception branches can be connected simultaneously and jointly to the antenna via this connection in a switch position of the multiswitch.

7. The module according to claim 1, wherein the multiswitch comprises switching transistors or other switching means that can each be controlled by a switching line.

8. The module according to claim 1, wherein the multiswitch comprises MEMS switches or semiconductor circuit elements in pHEMT, bipolar or CMOS technology.

9. The module according to claim 1, wherein the module comprises transmission branches of various mobile radio systems including transmission filters arranged therein, integrated as LC filters in a substrate of the module.

10. The module according to claim 1, wherein transmission and reception branches for four GSM mobile radio systems and for at least three WCDMA mobile radio systems are arranged with corresponding transmission and reception filters on the module.

11. The module according to claim 1, wherein the multiswitch, as desired, can connect outputs for transmission and/or reception branches of different mobile radio systems to a first or another antenna.

12. The module according to claim 1, wherein a reception branch with reception filter arranged therein is provided that can be used for two different mobile radio systems that work, however, in the same frequency band.

13. The module according to claim 1, wherein each of the transmission branch and reception branch of the first mobile radio system and the transmission branch and reception branch of the second mobile radio system is separately connected to an output of the multiswitch such that the transmission and reception branches of each system can be simultaneously connected to each other by the multiswitch.

14. The module according to claim 7, wherein the module comprises a decoder controlled with a number of control lines, smaller than a number of switching lines, wherein the decoder converts code transmitted via the control lines into a combination of switch positions.

15. The module according to claim 9, wherein the module comprises reception branches of various mobile radio systems, including reception filters arranged therein, the reception filters designed as SAW or BAW filters.

16. The module according to claim 9, wherein the module comprises power amplifiers in the transmission branches.

17. The module according to claim 9, wherein the module comprises a receiver IC and a transmitter IC.

18. The module according to claim 16, wherein a directional coupler is arranged between the power amplifier and an FDD duplexed transmission filter.

19. A module for mobile radio device, the module comprising:

a multiswitch configured to connect outputs for transmission and reception branches of different mobile radio systems to an antenna;

a first output of the multiswitch for connection to only the transmission branch of a first mobile radio system duplexed in an FDD mode;

a second output of the multiswitch for connection to only the reception branch of the first mobile radio system, the second output being separate from the first output;

a third output of the multiswitch for connection to the transmission branch of a second mobile radio system that is different from the first mobile radio system one; and a fourth output of the multiswitch for connection to the reception branch of the second mobile radio system, a fifth output of the multiswitch for connection of the transmission branch of a third mobile radio system that is different from the first and the second mobile radio systems, and a sixth output of the multiswitch for connection of the reception branch of the third mobile radio system, wherein the multiswitch comprises three of the above outputs on a first side of a switch that assigned to a transmission side and three other output on a second side of the switch that are assigned to a reception side of a respective frequency duplex mobile radio system each for connecting the respective branch to the respective output, wherein the switch is configured to provide only those switch positions that allow the simultaneous connection of corresponding pair of outputs to the antenna to allow simultaneous transmission and reception, wherein the part of the multiswitch with the antenna output and the three pairs of transmission and reception branches of the FDD duplexing mobile radio system is designed as a so-called three-on-three switch, wherein matching elements are integrated in the module to ensure FDD duplex operation for filters arranged in the transmission branch and reception branch of the first mobile radio system and are connected in this the first switch position to corresponding branches and wherein further matching elements are integrated in the module to ensure duplex operation for filters arranged in the transmission branch and reception branch of the second mobile radio system and are connected in the second switch position to corresponding branches.

20. A module for mobile radio device, the module comprising:
- an antenna node configured to be coupled to an antenna;
- a multiswitch with an antenna output coupled to the antenna node;
- a first filter coupled to a first output of the multiswitch, the first filter for a transmission branch of a first mobile radio system duplexed in an FDD mode;
- a second filter coupled to a second output of the multiswitch, the second filter for a reception branch of the first mobile radio system, wherein the second output is separate from the first output and wherein the multiswitch includes a switch position that simultaneously connects both the first output and the second output to the antenna node;
- a third filter coupled to a third output of the multiswitch, the third filter for a transmission branch of a second mobile radio system that is different from the first mobile radio system;
- a fourth filter coupled to a fourth output of the multiswitch, the fourth filter for a reception branch of the second mobile radio system, wherein the fourth output is separate from the third output;
- a fifth output of the multiswitch for connection of the transmission branch of a third mobile radio system that is different from the first and the second mobile radio systems; and
- a sixth output of the multiswitch for connection of the reception branch of the third mobile radio system, wherein the multiswitch comprises three of the above outputs on a first side of a switch that assigned to a transmission side and three other output on a second side of the switch that are assigned to a reception side of a respective frequency duplex mobile radio system each for connecting the respective branch to the respective output, wherein the switch is configured to provide only those switch positions that allow the simultaneous connection of corresponding pair of outputs to the antenna to allow simultaneous transmission and reception, wherein the part of the multiswitch with the antenna output and the three pairs of transmission and reception branches of the FDD duplexing mobile radio system is designed as a so-called three-on-three switch, and matching elements configured to ensure FDD duplex operation for first and second filters when the multiswitch is in the switch position that simultaneously connects both the first output and the second output to the antenna node.

* * * * *